M. C. CHAMBERLIN.
Carriage-Brake.
No. 18,386.
Patented Oct. 13, 1857.
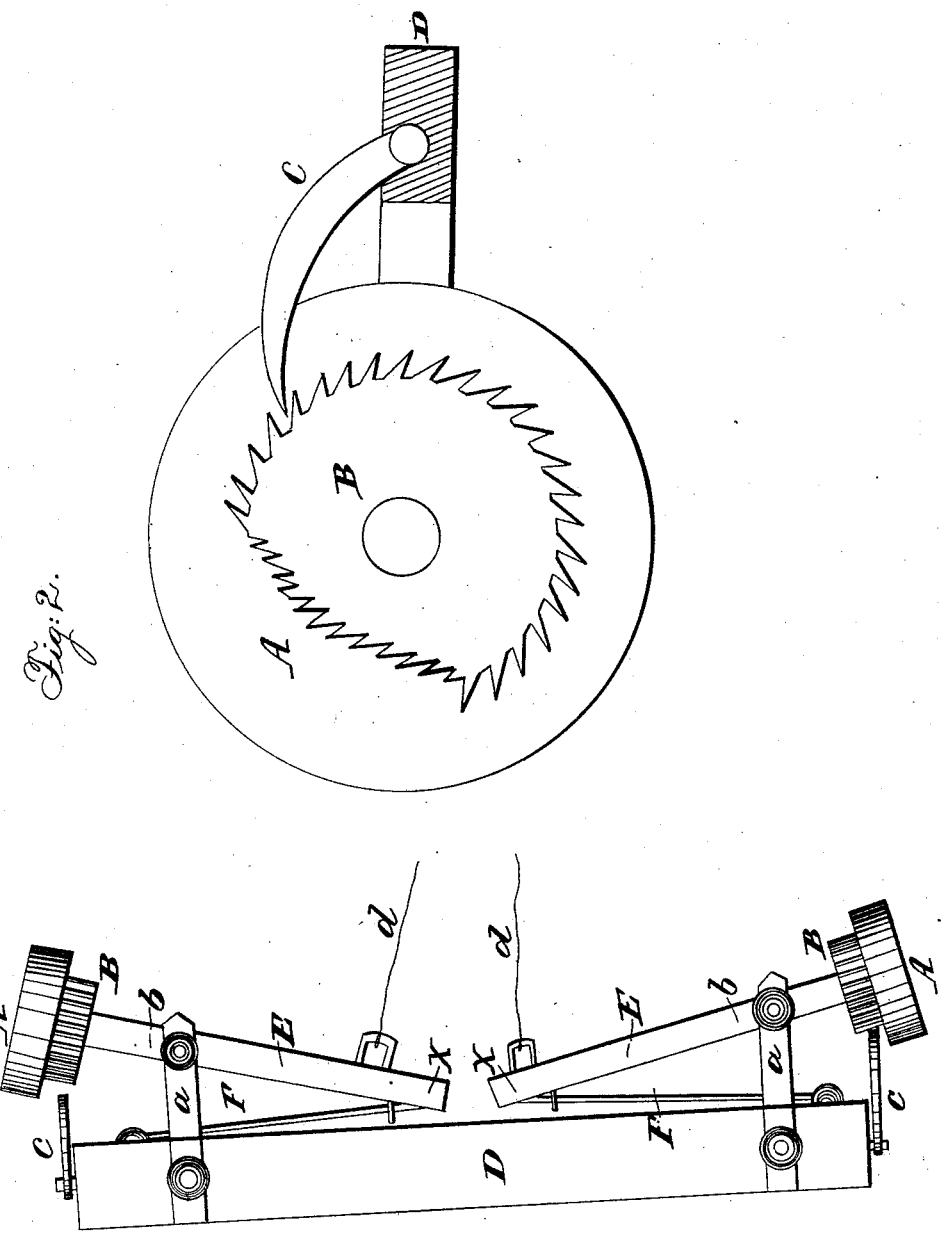

UNITED STATES PATENT OFFICE.

M. C. CHAMBERLIN, OF JOHNSONSBURG, NEW YORK.

WAGON-BRAKE.

Specification of Letters Patent No. 18,386, dated October 13, 1857.

*To all whom it may concern:*

Be it known that I, MELVIN C. CHAMBERLIN, of Johnsonburg, in the county of Wyoming and State of New York, have invented certain new and useful Improvements in Self-Acting Brakes for Vehicles; and I do hereby declare that the following is a full, clear, and exact description of the same, reference being had to the accompanying drawings and to the letters of reference marked thereon.

The nature of my improvement consists in the arrangement and employment in this connection of a revolving or stationary brake wheel, a ratchet wheel and ratchet, in the manner to be hereinafter specified.

In the accompanying drawings making a part of this specification Figure 1 represents the brake wheel and attachments detached from the vehicle. Fig. 2 represents the brake wheel, a portion of the ratchet wheel, the ratchet, and the end of the bearer.

In Fig. 1, A, are the brake wheels, which revolve, or are stationary, as circumstances require, B, is a ratchet wheel, which is secured to the wheel A, in the position shown in the drawing, E, is a lever on one end of which the wheels A, and B, are attached, D, is the bearer, F, is a spring one end of which is attached to the bearer, the other end operating the end of the lever marked $x$, $a$ is a strap or bar attached firmly to bearer D at one end and pivoted to lever E, at the other, $b$, is a pivot attaching E, to bar $a$, and serves as a fulcrum for said lever E, $d\ d$, are cords attached to the levers, and running forward to the neck yoke, for the purpose of operating the brakes.

In Fig. 2, A is the brake wheel, B, the ratchet wheel C the ratchet and D is the bearer.

In the operation of this invention it will be seen that when the vehicle is moving forward and down hill, the pressure of the vehicle forward causes the chords $d\ d$, to operate the ends of the levers E, marked $x$, from the bearer, thus causing wheel A to approach and come in contact with the wheels of the vehicle. It will be seen that as A approaches the wheel of the vehicle that ratchet C, will operate the ratchet wheel B, and cause brake wheel A, to revolve partially, thus changing its position; at each time levers E, are made to operate in this manner by the pressure of the vehicle, the brake wheel will change position and present a different surface to the wheel and thus the wear on the brake wheel will be alike all around. When the brake wheel A, comes in contact with the wheel of the vehicle, in its forward motion the ratchet operating on the ratchet wheel will prevent its moving and it becomes a stationary brake block, but when the wheel of the vehicle takes a backward motion, the pressure on wheel A is removed and not being obstructed by the ratchet, turns around freely with the wheel of the vehicle, and thus offers no resistance to its backing.

Having thus fully described my invention what I claim as new, and desire to secure by Letters Patent is,

I claim the arrangement of circular, revolving or stationary brake wheel A, with the ratchet wheel B, and ratchet C, the ratchet, so operating the ratchet wheel, when in use, that the wheel, A, will change its position every time the brake arms, being acted upon by the pressure of the wagon on the horses, are reversed, wheel A, being a stationary brake block when the wagon is going down hill, but revolving with the wheel, when the wagon is backed, substantially as herein set forth and for the purposes described.

M. C. CHAMBERLIN.

Witnesses:
GEORGE M. DIXON,
JAMES A. DODGE.